United States Patent
Richardson et al.

(10) Patent No.: US 12,122,448 B1
(45) Date of Patent: Oct. 22, 2024

(54) ZERO TURNING RADIUS VEHICLE AND DRIVE SYSTEM FOR ZERO TURNING RADIUS VEHICLE

(71) Applicant: Parker-Hannifin Corporation, Cleveland, OH (US)

(72) Inventors: Jason Richardson, Chuckey, TN (US); Randall Thompson, Landcaster, SC (US); Roger Gray, Greeneville, TN (US); Ryan Press, Clover, SC (US); Steven Huard, New Ulm, MN (US)

(73) Assignee: Parker-Hannifin Corporation, Cleveland, OH (US)

(*) Notice: Subject to any disclaimer, the term of this patent is extended or adjusted under 35 U.S.C. 154(b) by 1086 days.

(21) Appl. No.: 17/010,432

(22) Filed: Sep. 2, 2020

Related U.S. Application Data

(60) Provisional application No. 62/902,068, filed on Sep. 18, 2019.

(51) Int. Cl.
| | | |
|---|---|---|
| *B62D 11/04* | (2006.01) | |
| *A01D 34/66* | (2006.01) | |
| *A01D 69/02* | (2006.01) | |
| *A01D 101/00* | (2006.01) | |
| *B62D 1/04* | (2006.01) | |
| *B62D 1/12* | (2006.01) | |
| *B62D 15/02* | (2006.01) | |

(52) U.S. Cl.
CPC .............. *B62D 11/04* (2013.01); *A01D 34/66* (2013.01); *A01D 69/02* (2013.01); *A01D 2101/00* (2013.01); *B62D 1/046* (2013.01); *B62D 1/12* (2013.01); *B62D 15/0215* (2013.01)

(58) Field of Classification Search
CPC ...... B62D 1/12; B62D 1/046; A01D 2101/00; A01D 69/02; A01D 34/66
See application file for complete search history.

(56) References Cited

U.S. PATENT DOCUMENTS

| | | |
|---|---|---|
| 6,725,954 B1 | 4/2004 | Keane et al. |
| 7,894,957 B2 | 2/2011 | Carlson |
| 7,975,786 B2 | 7/2011 | Ishii et al. |
| 8,950,520 B2 | 2/2015 | Hauser et al. |
| 9,538,706 B2 | 1/2017 | Haun |
| 9,764,734 B1 | 9/2017 | Brown |
| 9,938,966 B2 | 4/2018 | Heathcoat, Jr. et al. |
| 2003/0187558 A1* | 10/2003 | Zheng ............... B62D 6/008 180/443 |
| 2011/0277433 A1* | 11/2011 | Sugden ............... B60N 2/544 296/65.02 |
| 2019/0111789 A1 | 4/2019 | Matsuda et al. |

FOREIGN PATENT DOCUMENTS

WO    2018211436 A1    11/2018

\* cited by examiner

*Primary Examiner* — Kevin A Lathers
(74) *Attorney, Agent, or Firm* — McDonnell Boehnen Hulbert & Berghoff LLP

(57) ABSTRACT

A drive system for a zero turning radius (ZTR) vehicle includes a steering control and a sensor configured to receive a position of the steering control. A damper is coupled to the steering control and is configured to apply a selectable amount of resistive force to the steering control. A controller is in communication with the sensor and is configured to operate a motor of the ZTR vehicle responsive to the position of the steering control, and to operate the damper to apply a resistive force to the steering control responsive to actuation of the steering control.

11 Claims, 6 Drawing Sheets

ZERO TURNING RADIUS VEHICLE AND DRIVE SYSTEM FOR ZERO TURNING RADIUS VEHICLE

RELATED APPLICATIONS

This application claims the benefit of priority under 35 U.S.C. § 119(e) of U.S. Provisional Application No. 62/902,068, filed Sep. 18, 2019, the content of which is incorporated herein by reference in its entirety.

BACKGROUND

Field

This application generally relates to zero turning radius vehicles. In particular, this application describes a drive system for a zero turning radius vehicle.

Description of Related Art

Zero turning radius (ZTR) vehicles typically utilize a pair of control levers to control the speed and direction of the drive wheels on the ZTR vehicle. For example, a left control lever may control the speed and direction of a left drive wheel and a right control lever may control the speed and direction of a right drive wheel.

Many ZTR vehicles utilize a hydrostatic transmission. In such a configuration, a combustion engine turns a hydraulic pump that in turn provides hydraulic fluid under pressure to the hydrostatic transmission. The hydrostatic transmission turns the drive wheels of the ZTR vehicle responsive to the position of the control levers, which are mechanically coupled directly or through one or more linkages to the hydrostatic transmission.

Newer ZTR vehicles may utilize an electric drive system in which the drive wheels are driven by a pair of electric motors. In such systems, operator feedback in the form of friction and linear force into the control levers is removed and causes a disconnect between the operator and the vehicle. This often results in significantly reduced operator response to machine movement and the over control of the vehicle may give a sense of being out of control.

SUMMARY

The problems described above are overcome by the embodiments disclosed herein. In general, the embodiments include a damper that is connected either directly or through one or more linkages to a steering control such as a control lever. In some embodiments, the damper includes a cylinder/piston configuration in which fluid from a cap side of the cylinder is returned to a rod side of the cylinder via a channel between the cap side and the rod side of the cylinder. The damper is configured to provide a selectable amount of resistance to the steering control to mimic the frictional and linear forces encountered on a more traditional hydrostatic transmission-based ZTR.

A first embodiment corresponds to a drive system for a zero turning radius (ZTR) vehicle. The drive system includes a steering control and a sensor configured to receive a position of the steering control. A damper is coupled to the steering control and is configured to apply a selectable amount of resistive force to the steering control. A controller is in communication with the sensor and is configured to operate a motor of the ZTR vehicle responsive to the position of the steering control and to operate the damper to apply a resistive force to the steering control responsive to actuation of the steering control.

A second embodiment corresponds to a zero turning radius mower. The ZTR mower includes a pair of drive wheels, where each drive wheel is in mechanical communication with one of a pair of electric motors. The ZTR mower includes at least one steering control and a sensor configured to receive a position of the steering control. A controller is in communication with the sensor and is configured to operate at least one of the electric motors responsive to the position of the steering control. An adjustable damper is coupled to the steering control and is in communication with the controller. The controller is configured to operate the adjustable damper to apply a resistive force to the steering control responsive to actuation of the steering control.

A third embodiment corresponds to a zero turning radius vehicle. The ZTR vehicle includes a pair of drive wheels in mechanical communication with a motor. The ZTR vehicle further includes a steering control that includes an operator-gripping region and at least one device disposed within the operator-gripping region. A controller of the ZTR vehicle is configured to adjust the speed and direction of each of the drive wheels responsive to a position of the steering control and to control a secondary operation of the ZTR vehicle responsive to a signal from the device.

BRIEF DESCRIPTION OF THE DRAWINGS

The accompanying drawings are included to provide a further understanding of the claims, are incorporated in, and constitute a part of this specification. The detailed description and illustrated embodiments described serve to explain the principles defined by the claims.

DETAILED DESCRIPTION

Figure 1:
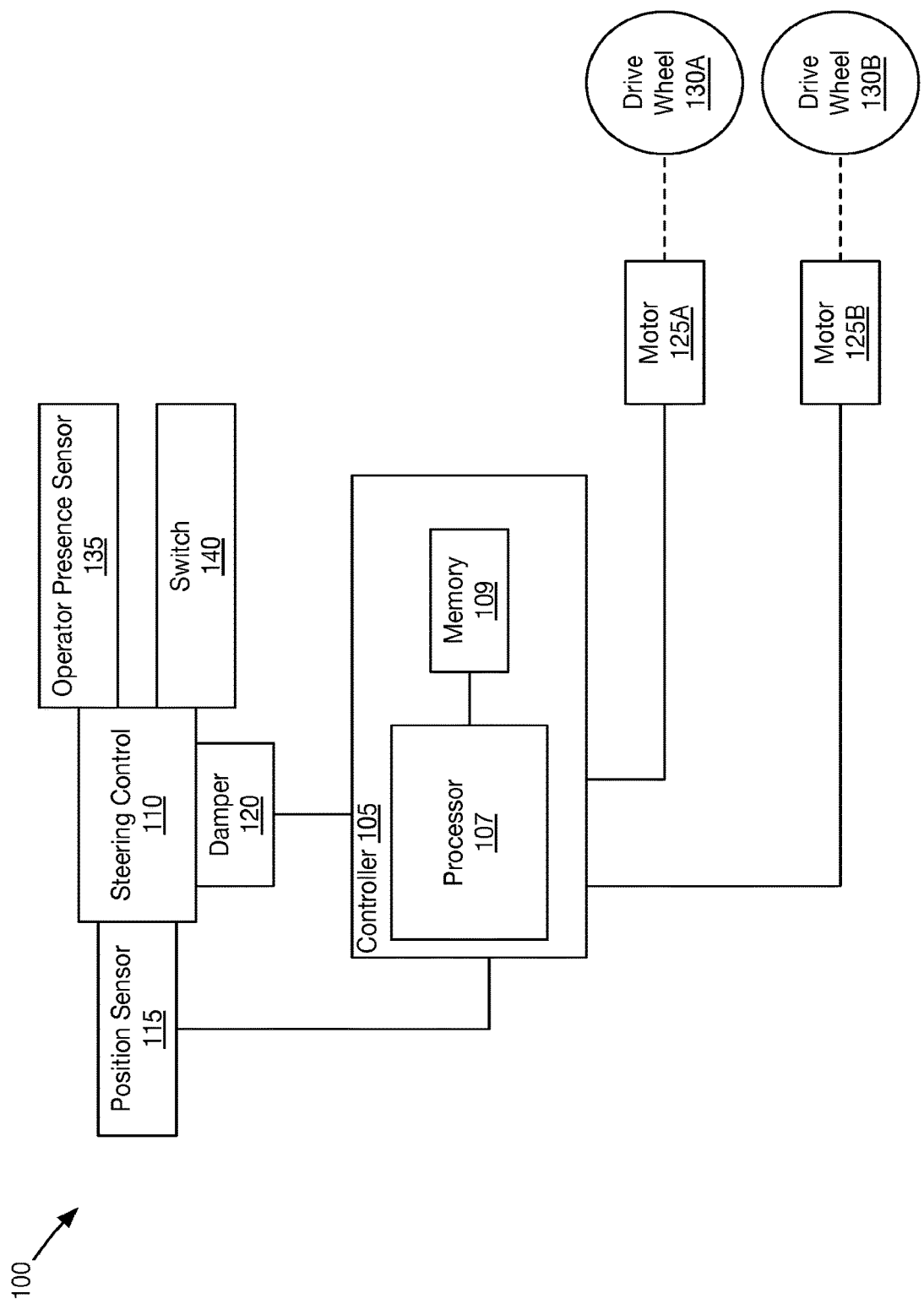
FIG. 1 is a schematic representation of an exemplary drive system for a zero turning radius (ZTR) vehicle, according to a first embodiment.

FIG. 1 is a schematic representation of an exemplary drive system 100 for a zero turning radius (ZTR) vehicle, according to a first embodiment. Exemplary components of the drive system 100 include a controller 105, a steering control 110, a position sensor 115, a damper 120, a first motor 125A, and a second motor 125B. In some embodiments, the drive system 100 may also include one or more operator presence sensors 135 and one or more switches 140.

The controller 105 may include a processor 107, a memory 109, and various peripheral components that facilitate receiving signals from and controlling components external to the controller 105. While a single controller 105 is illustrated, it is understood that there may be any number of controllers and that the operations described herein by the illustrated controller 105 may be distributed among the illustrated controller 105 and the other controllers. In this regard, the controller 105 may be configured to communicate information over a communication bus used by the other controllers such as an I²C bus or another suitable bus to coordinate activities performed by the other controllers.

The processor 107 may correspond to, for example, an ARM® based processor, an Intel® based processor, or may be based on a different technology. The memory 109 may be in communication with the processor 107 and may include instruction code that is executed by the processor 107 to cause the processor 107 to control various operations of the ZTR vehicle. Aspects of these operations will be described in more detail below.

The steering control 110 corresponds to a user interface that facilitates steering the ZTR vehicle. For example, the steering control 110 may correspond to a pair of lap bars/levers (FIG. 6A), a steering wheel (FIG. 6B), a stick, etc.

The position sensor 115 may be configured to generate information indicative of a position of the steering control 110. The information may correspond to an analog signal that changes in proportion to the position or a digital signal that provides a numerical representation of the position.

In the case of a steering wheel, the position sensor 115 may indicate the angle of rotation of the steering wheel. For example, in the analog signal case, the signal may be biased at a particular voltage greater than zero that indicates the steering wheel is centered. Voltages above and below that voltage may indicate a direction and an amount by which the steering wheel is turned. In the case of a digital signal, a value of zero may indicate that the steering wheels is centered. Values greater than or less than zero may indicate a direction and an amount by which the steering wheel is turned. The values generated by the analog and digital signals to convey the position of the steering wheel may be different.

In the case of a pair of lap bars/levers, a position sensor 115 may be provided for each lap bar. For example, in the analog signal case, the signal may be biased at a particular voltage greater than zero that indicates that the lap bar is centered. Voltages above and below that voltage may indicate a direction (forward or backward) and an amount by which the lap bar/lever is moved. In the case of a digital signal, a value of zero may indicate that the lap bar/lever is centered. Values greater than or less than zero may indicate a direction (forward or backward) and an amount by which the lap bar/lever is moved. The values generated by the analog and digital signals to convey the position of the lap bar/lever may be different.

The damper 120 is configured to apply a selectable amount of resistive force to the steering control 110. In this regard, the amount of resistive force applied to the steering control 110 may be selected to mimic the frictional and linear forces one may encounter from the steering wheel or lap bar of a traditional ZTR having a hydrostatic transmission. For example, the amount of frictional and linear forces encountered may vary depending upon how far the steering wheel or lap bar is moved relative to a centered position. To mimic this, the amount of resistive force applied by the damper 120 may be controlled to vary from, for example, a negligible amount when the steering control 110 is in a centered position, to a higher amount when the steering control 110 is at an extreme end to mimic the frictional and linear forces encountered in a traditional ZTR having a hydrostatic transmission when the steering wheel or lap bar of ZTR is moved to its most extreme position.

Figure 2:
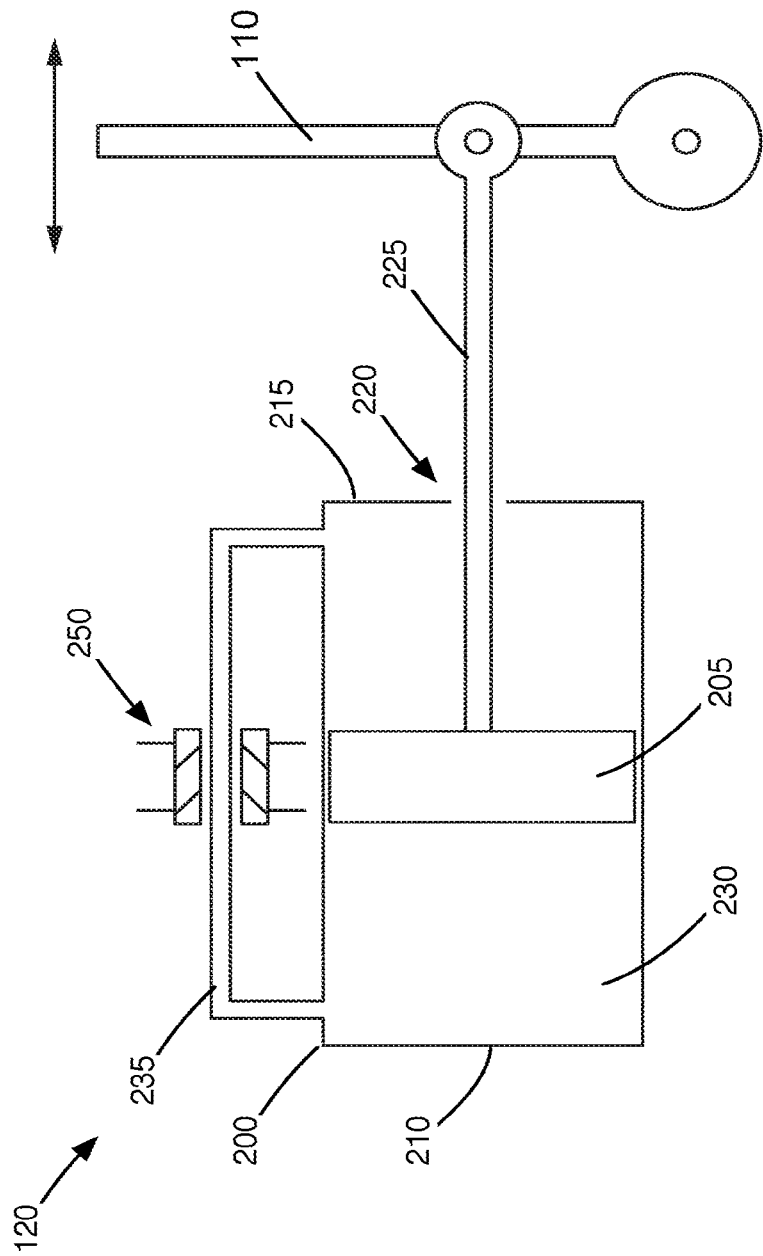
FIG. 2 illustrates a first exemplary damper embodiment that may be utilized in connection with the exemplary drive system embodiment.
Figure 3:
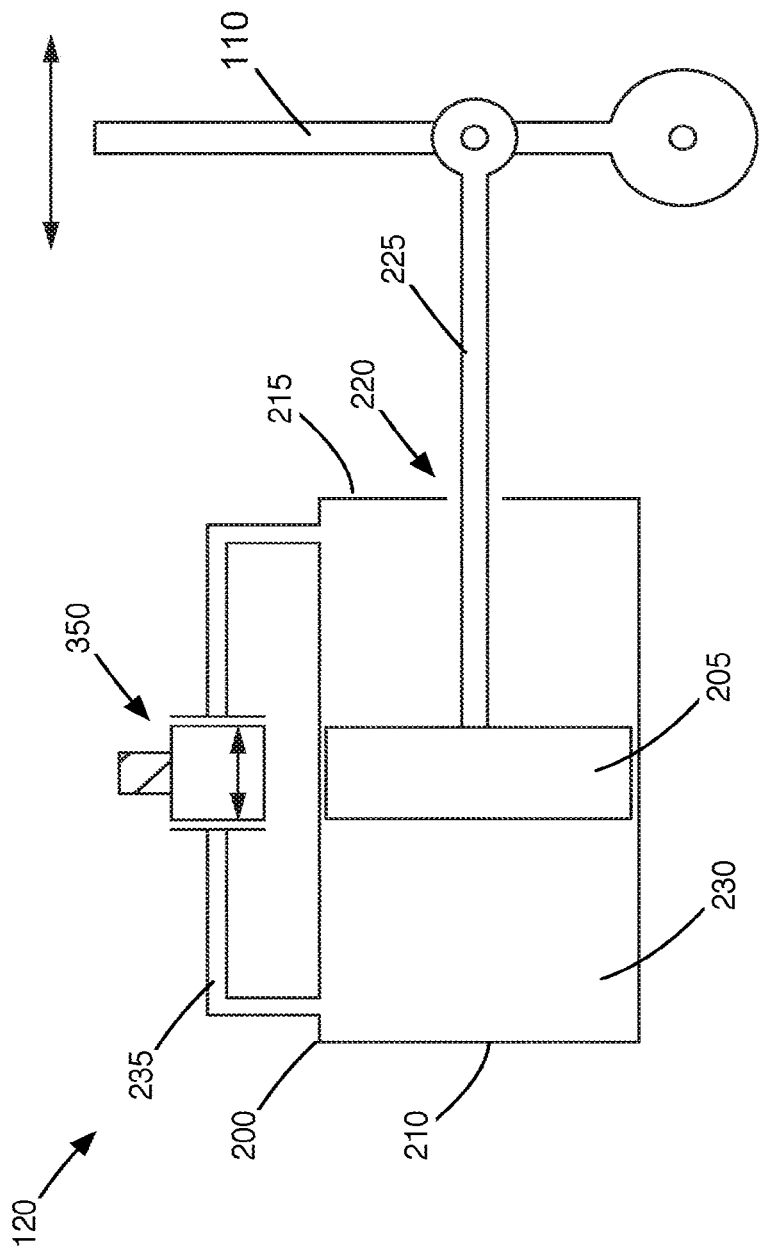
FIG. 3 illustrates a second exemplary damper embodiment that may be utilized in connection with the exemplary drive system embodiment.
Figure 4:
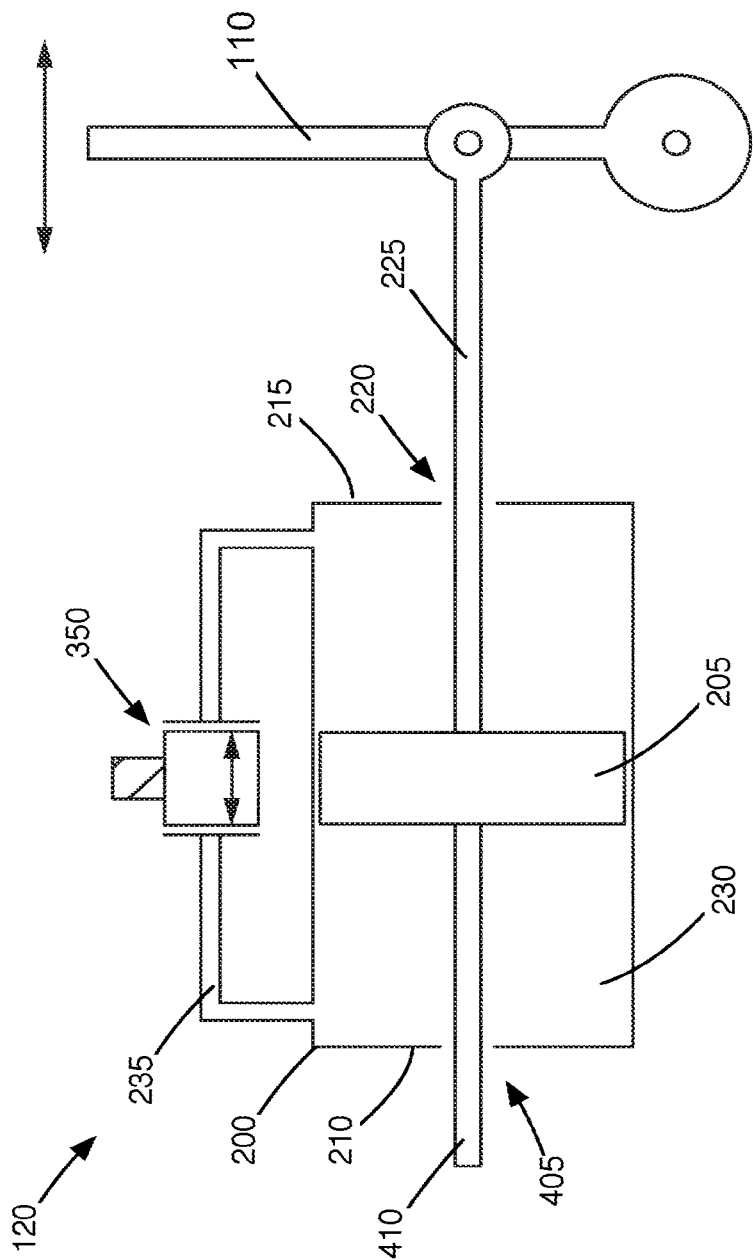
FIG. 4 illustrates a third exemplary damper embodiment that may be utilized in connection with the exemplary drive system embodiment.

FIGS. 2-4 illustrate exemplary damper embodiments that may be utilized in connection with the exemplary drive system embodiment. Referring to FIG. 2, a first damper embodiment 120 may include a cylinder 200 and a piston 205 disposed therein. The cylinder 200 may include a cap end 210 and a rod end 215. The rod end 215 may define a rod opening 220 through which a rod 225 may extend. The rod opening 220 may include a gasket (not shown) that allows the rod 225 to move freely while simultaneously preventing a hydraulic fluid 230 within the cylinder 200 from leaking from the cylinder 200.

A first end of the rod 225 may be coupled to the piston 205. A second end of the rod 225 may be coupled to the steering control 110 directly or via one or more mechanical linkages (not shown) to the steering control 110. Movement of the steering control 110 from one extreme position to an opposite extreme position may cause the piston 205 to move between the cap end 210 and a rod end 215 of the cylinder 200.

A channel 235 may be provided between the cap end 210 and the rod end 215 to facilitate fluid flow between the cap end 210 and the rod end 215 of the cylinder 200. For example, the cylinder 200 may include a cap-side port and a rod-side port that open into the cylinder 200. The channel 235 may correspond to a tube that fluidly couples the cap-side port and the rod-side port. In this regard, the channel 235 may be formed from either a flexible material or a rigid material. The channel 235 may be formed integrally with the cylinder 200 or may be a separate component that is, for example, threaded or welded to the cylinder 200.

In the first embodiment, a hydraulic fluid 230 that includes a rheo-magnetic material may be provided within the cylinder 200. Extension and retraction of the piston 205 may cause the hydraulic fluid 230 to flow through the channel 235 and between the cap-side and rod-side of the cylinder 200. An electromagnet 250 may be provided in proximity to the channel 235 and, when energized, may cause the viscosity of the hydraulic fluid 230 to increase. The increased viscosity in turn increases the resistance encountered in moving the steering control 110 from one extreme position to an opposite extreme position. The electromagnet 250 may be deenergized to minimize the resistance encountered in moving the steering control 110 from one extreme position to an opposite extreme position. Further, the electromagnet 250 may be energized to variable degrees to provide for a variable amount of resistance.

Referring to FIG. 3, in a second damper embodiment 120, the hydraulic fluid may correspond to an oil-based product that does not exhibit rheo-magnetic properties and a valve 350 may be placed in line with the channel 235 and utilized to restrict fluid flow through the channel 235. For example, the valve 350 may be moved towards a closed position to increase the resistance encountered in moving the steering control 110 from one extreme position to an opposite extreme position. The valve 350 may be opened to minimize the resistance encountered in moving the steering control 110 from one extreme position to an opposite extreme position. Further, the valve 350 may be opened to variable degrees to provide for a variable amount of resistance.

Referring to FIG. 4, in a third damper embodiment 120, the cap end 210 may define a rod opening 405 through which a second rod 410 may extend. The rod opening 405 may include a gasket (not shown) that allows the second rod 410 to move freely while simultaneously preventing hydraulic fluid 230 within the cylinder 200 from leaking from the cylinder 200.

In the single rod damper embodiments 120 illustrated in FIGS. 2 and 3, the force on the hydraulic fluid 230 in the cap end 210 is greater than the force on hydraulic fluid 230 in the rod end 215, allowing for movements of the steering control 110 to the left or counterclockwise to be easier than movements to the right or clockwise. In the double-rod configuration of FIG. 4, the force on the hydraulic fluid 230 in the cap end 210 is the same as the force on hydraulic fluid 230 in the rod end 215. Thus, the same amount of force is required to move the steering control 110 in either direction.

In some instances, the single rod configuration of FIGS. 2 and 3 may be advantageous. For example, in some ZTR vehicles, it may be desirable for the reverse movement of a lap bar to be less aggressive (i.e., easier to perform) than a forward movement of the lap bar. However, in cases where it is desirable for the resistance to be the same in either direction, the double-rod configuration may be utilized.

The damper embodiment 120 of FIG. 4 is illustrated as using a valve 350 to control the resistance of the damper 120. However, the double-rod configuration may be applied to the damper embodiment 120 of FIG. 2, which utilizes the combination of an electromagnet and rheo-magnetic hydraulic fluid to provide similar advantages.

In the exemplary damper embodiments 120 of FIGS. 2-4, the cylinder 200 may have an inner diameter. The piston 205 may have a diameter comparable to the inner diameter of the cylinder 200.

While the damper embodiments 120 are described as utilizing a cylinder, it is understood that a different shaped volume with a correspondingly shaped piston may be utilized. For example, the volume may be a cube and the piston may have a square surface area.

In addition, while the channel 235 is illustrated as being external to the cylinder 200, in alternative implementations, the channel 235 may be disposed within the cylinder 200 and the piston 205 may be shaped accordingly to allow for movement of the piston 205.

Figure 5:
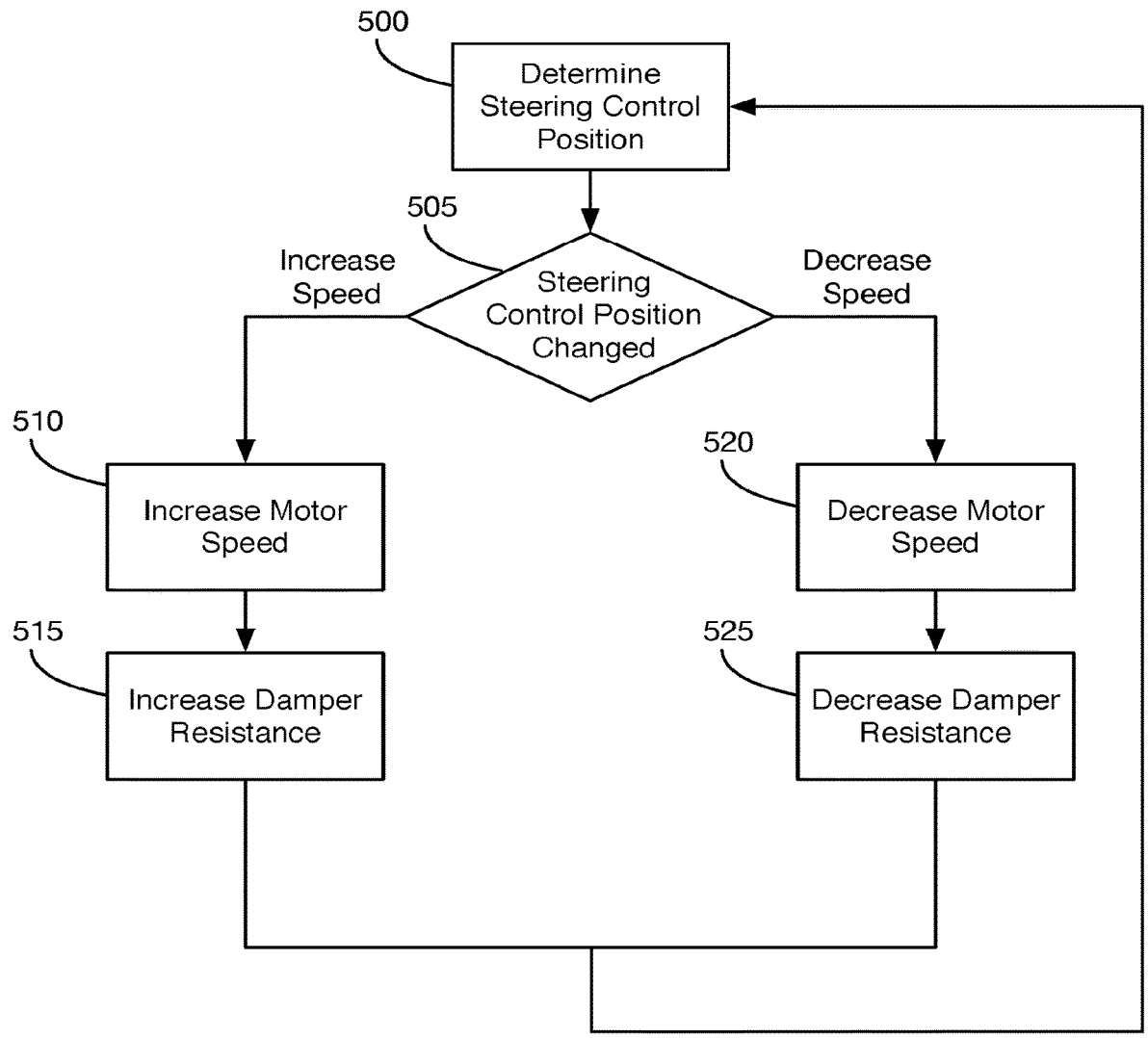
FIG. 5 illustrates exemplary operations performed by a controller of the drive system.

FIG. 5 illustrates exemplary operations performed by the controller 105 of the drive system 100. In this regard, one or more of the operations may be implemented via instruction code, stored in the memory 109 of the controller 105, configured to cause the processor 107 of the controller 105 to perform the operations illustrated in the figures and discussed herein.

At operation 500, the controller 105 may determine the position of the steering control 110. For example, the position may be determined based on information provided by the position sensor 115.

If at operation 505, the controller 105 determines that the position change corresponds to an indication by an operator to increase the speed of the ZTR vehicle, then at operation 510, the speed of the motor(s) (125A and 125B) may be increased. For example, when the steering control 110 corresponds to a lap bar, centering of the lap bar may indicate that the operator does not want a corresponding wheel to be turning. Moving the lap bar away from the centered position, either forward or backward, may indicate that the operator wants the wheels to increase in speed in the corresponding direction.

At operation 515, the controller 105 may operate the damper 120 to provide increased resistance to thereby increase an amount of resistance encountered by the operator in moving, for example, the lap bar forward. In this regard, the resistance may be set in proportion to an amount by which the steering control 110 is moved from a centered position. For example, when a lap bar is centered or close to being centered, the resistance of the damper 120 may be set to a minimal amount. As the lap bar is moved further from the centered position, the resistance of the damper 120 may be increased. The resistance may be increased linearly (i.e., in direct proportion to the position of the lab bar), or non-linearly. The resistance of the damper 120 may be increased in fixed increments. The resistance of the damper 120 may be increased based on a function of the rate of change in the position of the lap bar. For example, the increase in resistance may be set higher for higher rates of change and lower for lower rates of change. Thus, an operator of the ZTR vehicle will encounter increased resistance as the lap bar is moved. This in turn provides feedback to the operator that the lap bar is approaching a terminal position.

If at operation 505, the controller 105 determines that the position change corresponds to an indication by an operator to decrease the speed of the ZTR vehicle, then at operation 520, the speed of the motor(s) (125A and 125B) may be decreased. For example, when the steering control 110 corresponds to a lap bar, moving the lap bar towards the centered position may indicate that the operator wants to stop a corresponding wheel from turning, regardless of the direction in which the wheel is turning.

At operation 525, the controller 105 may operate the damper 120 to provide a decreased amount of resistance to thereby decrease an amount of resistance encountered by the operator in moving, for example, the lap bar toward the centered position. As described above, the resistance may be set in proportion to an amount by which the steering control 110 is moved from the centered position. For example, the resistance may be decreased in a linear manner, a nonlinear manner, a stepwise manner, and/or as a function of the rate of change in the position of the lap bar.

Figure 6B:
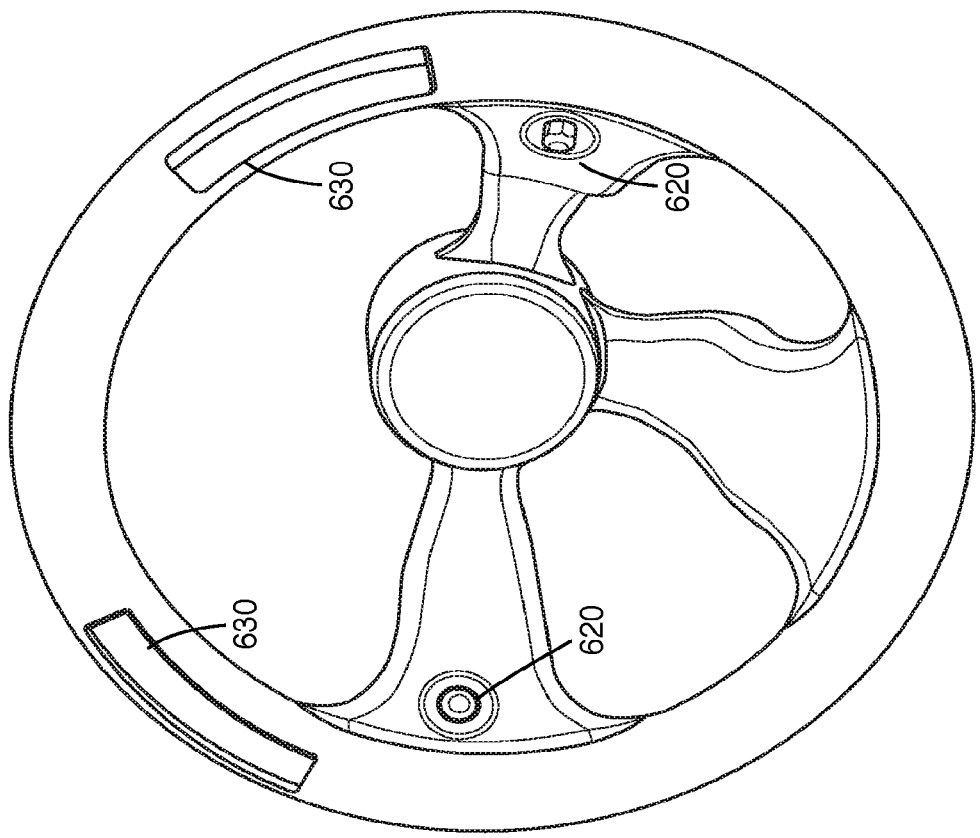
FIG. 6B illustrates a second exemplary steering control embodiment that may be utilized in connection with the drive system illustrated in FIG. 1.
Figure 6A:
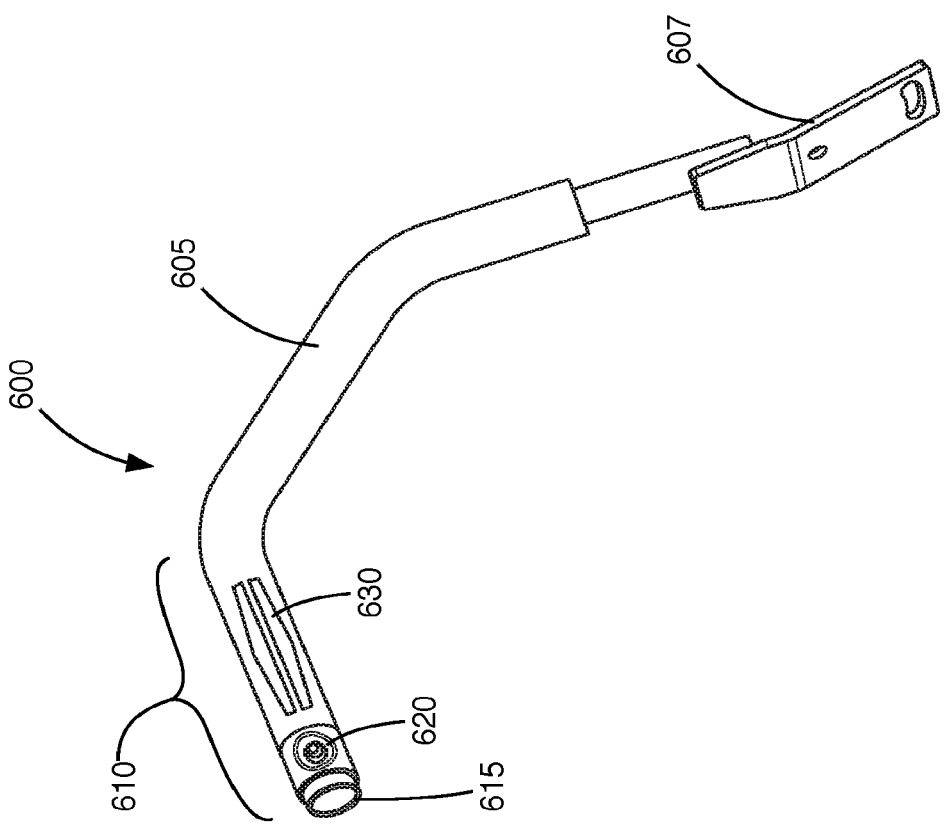
FIG. 6A illustrates a first exemplary steering control embodiment that may be utilized in connection with the drive system illustrated in FIG. 1.

FIGS. 6A and 6B illustrate first and second exemplary steering control embodiments that may be utilized in connection with the drive system 100 illustrated in FIG. 1.

FIG. 6A illustrates an exemplary lap bar that may correspond to one of a pair of lap bars utilized to control the direction of the ZTR vehicle. Each lap bar 600 may control the direction and speed of a drive wheel (130A and 130B) of the ZTR vehicle.

The exemplary lap bar 600 includes an extension region 605 and an operator-gripping region 610. The extension region 605 may include an end 607 configured to be coupled to a frame (not shown) of the ZTR vehicle. The end 607 may be coupled or in communication with the position sensor 115 and damper 120, described above.

Generally, an operator engages the operator-gripping region 610 when driving the ZTR vehicle. For example, the operator may position his right hand over the operator-gripping region 610 of a right lap bar and his left hand over the operator-gripping region 610 of a left lap bar.

The operator-gripping region 610 may include one or more devices for controlling auxiliary operations of the ZTR vehicle. For example, a switch 620 may be provided on a ZTR mower. Actuation of the switch 620 may, for example, initiate rotation of one or more blades of the ZTR mower. The switch 620 may correspond to a so-called "kill switch" to deactivate the ZTR mower entirely. That is, activation of the switch 620 may stop the motor (125A and 125B) of the ZTR mower.

In some implementations, the operator-gripping region 610 may include an operator presence sensor 630 configured to detect contact between the hand of the operator and the operator-gripping region 610. For example, the operator presence sensor 630 may correspond to a pair of electrodes separated by a dielectric material. The operator presence sensor 630 may correspond to a capacitive sense pad. Other sensor types may be utilized.

When the operator presence sensor 630 is covered by, for example, the operator's hand, the operator presence sensor 630 may communicate a signal to the controller 105. The controller 105 may, in turn, determine that the operator is gripping the operator-gripping region 610 of the lap bar.

In operation, the controller 105 may disengage one or more functions of the ZTR vehicle when the operator releases the operator-gripping region 610. For example, the controller 105 may disengage the blades of a ZTR mower, the controller 105 may disable propulsion to the driver wheels, etc.

In some implementations, the operator-gripping region 610 may include a proximity sensor 615 configured to detect alignment between a pair of lap bars. In this regard, a first lap bar may include a first part of the proximity sensor 615 and the second lap bar may include a second part of the proximity sensor 615. The first part and second part may be arranged near an end of a respective operator-gripping region 610, as illustrated.

The proximity sensor 615 may utilize an optical mechanism to determine proximity. For example, the first part may generate a light beam and the second part may detect the light beam when the second part comes in proximity to the first part. The proximity sensor 615 may utilize a magnetic mechanism to determine proximity. In this case, the first part may generate a magnetic field and the second part may detect the magnetic field when the second part comes in proximity to the first part. Other devices for determining proximity between objects may be utilized.

In operation, the controller 105 of the ZTR vehicle may perform an operation when the pair of lap bars are in proximity to one another. For example, lap bars of typical ZTR vehicles may have to be adjusted/trimmed to cause the ZTR vehicle to travel in a straight line when the lap bars are aligned. This can be a cumbersome to processes to perform. However, in the embodiment, the controller 105 may control the first and second drive wheels 130A and 130B to rotate at the same speed when the lap bars are in proximity to one another. I.e., within a certain range of one another. For example, when the lap bars come within a few inches of one another, the controller 105 may control the first and second drive wheels 130A and 130B to rotate at the same speed. This advantageously obviates the requirement of adjusting/trimming the lap bars.

FIG. 6B illustrates an exemplary steering wheel that may be used to control the direction of the ZTR vehicle. Similar to above, the steering wheel may include devices (620 and 630) for controlling auxiliary operations of the ZTR vehicle While the systems and methods of operation have been described with reference to certain embodiments, it will be understood by those skilled in the art that various changes may be made and equivalents may be substituted without departing from the scope of the claims. Therefore, it is intended that the present methods and systems not be limited to the particular embodiment disclosed, but that the disclosed methods and systems include all embodiments falling within the scope of the appended claims.

The invention claimed is:

1. A drive system for a zero turning radius (ZTR) vehicle, the drive system comprising:
   a steering control;
   a sensor configured to receive a position of the steering control;
   a damper, coupled to the steering control, configured to apply a selectable amount of resistive force to the steering control; and
   a controller, in communication with the sensor, configured to operate a motor responsive to the position of the steering control, and to operate the damper to apply a resistive force to the steering control, wherein the resistive force is proportional to the position of the steering control.

2. The drive system according to claim 1, wherein the controller operates the damper to apply a resistive force to the steering control responsive to a direction of movement of the steering control.

3. The drive system according to claim 2, wherein the resistive force applied when the steering control is moved in a first direction is less than a resistive force applied when the steering control is moved in a second direction.

4. The drive system according to claim 3, wherein the steering control corresponds to one of: a stick, a lever, a lap bar, and a steering wheel.

5. A drive system for a zero turning radius (ZTR) vehicle, the drive system comprising:
   a steering control;
   a sensor configured to receive a position of the steering control;
   a damper, coupled to the steering control, configured to apply a selectable amount of resistive force to the steering control; and
   a controller, in communication with the sensor, configured to operate a motor that drives the ZTR vehicle responsive to the position of the steering control, and wherein the controller operates the damper to increase an amount of resistance as the steering control is moved to increase a speed of the motor, and controls the damper to decrease the amount of resistance as the steering control is moved to decrease the speed of the motor.

6. The drive system according to claim 1, wherein the damper further comprises:
   a cylinder having a closed cap end and a rod end that defines a rod opening;
   a channel that fluidly couples the cap end and the rod end of the cylinder;
   a hydraulic fluid disposed within the cylinder;
   a piston disposed within the cylinder; and
   a rod having a first end coupled to the piston and a second end that extends through the rod opening of the cylinder, wherein the second end is in mechanical communication with the steering control.

7. The drive system according to claim 6, wherein the hydraulic fluid comprises a rheo-magnetic material, wherein the drive system further comprises:
   an electromagnet in proximity to the channel that is operated by the controller to generate an electromagnetic field that causes a viscosity of hydraulic fluid flowing through the channel to increase.

8. The drive system according to claim 6, wherein the drive system further comprises:
   a valve disposed within the channel that is operated by the controller to restrict fluid flow through the channel.

9. A zero turning radius (ZTR) mower, comprising:
   a pair of drive wheels, each drive wheel in mechanical communication with one of a pair of electric motors;
   at least one steering control;
   a sensor configured to receive a position of the at least one steering control;

a controller, in communication with the sensor, configured to operate at least one of the pair of electric motors responsive to the position of the steering control; and an adjustable damper coupled to the steering control and in communication with the controller, wherein the controller is configured to operate the adjustable damper to apply a resistive force to the steering control, wherein the resistive force is proportional to the position of the steering control.

10. The zero turning radius mower according to claim 9, wherein the controller operates the damper to apply a resistive force to the steering control responsive to a direction of movement of the steering control.

11. The zero turning radius mower according to claim 10, wherein the resistive force applied when the steering control is moved in a first direction is less than a resistive force applied when the steering control is moved in a second direction.

\* \* \* \* \*